United States Patent [19]

Dion et al.

[11] Patent Number: 4,992,802

[45] Date of Patent: Feb. 12, 1991

[54] METHOD AND APPARATUS FOR EXTENDING THE ENVIRONMENTAL OPERATING RANGE OF AN INK JET PRINT CARTRIDGE

[75] Inventors: John H. Dion; Thomas H. Winslow, both of Corvallis, Oreg.

[73] Assignee: Hewlett-Packard Company, Palo Alto, Calif.

[21] Appl. No.: 289,876

[22] Filed: Dec. 22, 1988

[51] Int. Cl.[5] .................... G01D 15/18

[52] U.S. Cl. .................... 346/1.1; 346/75; 346/140 R

[58] Field of Search .................... 346/1.1, 75, 140 R

[56] References Cited

U.S. PATENT DOCUMENTS

| | | | |
|---|---|---|---|
| 3,296,624 | 1/1967 | Ascoli | 346/140 |
| 3,452,361 | 6/1969 | Williams, Jr. | 346/140 |
| 4,272,773 | 6/1981 | Halasz | 346/140 R |
| 4,296,421 | 10/1981 | Hara et al. | 346/140 R |
| 4,313,124 | 1/1982 | Hara | 346/140 R |
| 4,342,042 | 7/1982 | Cruz-Uribe et al. | 346/140 R |
| 4,412,232 | 10/1983 | Weber et al. | 346/140 R |
| 4,419,678 | 12/1983 | Kasugayama et al. | 346/140 R |
| 4,422,084 | 12/1983 | Saito | 346/140 R |
| 4,436,439 | 3/1984 | Koto et al. | 400/126 |
| 4,490,728 | 12/1984 | Vaught et al. | 346/1.1 |
| 4,500,895 | 2/1985 | Buck et al. | 346/140 R |
| 4,503,443 | 3/1985 | Dagna et al. | 346/140 R |
| 4,509,062 | 4/1985 | Low et al. | 346/140 R |
| 4,539,568 | 9/1985 | Lewis et al. | 346/1.1 |
| 4,571,599 | 2/1986 | Rezanka | 346/140 R |
| 4,677,447 | 6/1987 | Nielsen | 346/140 R |
| 4,714,937 | 12/1987 | Kaplinsky | 346/140 R |
| 4,785,314 | 11/1988 | Terasawa et al. | 346/140 R |
| 4,791,438 | 12/1988 | Hanson et al. | 346/140 R |

OTHER PUBLICATIONS

Durbeck, Robert C. et al., "Ink Jet Printing," *Output Hardcopy Devices,* Academic Press, Inc., 1988, Chapter 13, pp. 311-370.

Hewlett-Packard Journal, May 1985, pp. 1-27.

*Primary Examiner*—Bruce A. Reynolds
*Assistant Examiner*—Gerald E. Preston

[57] ABSTRACT

An ink jet print cartridge includes an ink reservoir, a print head for ejecting ink from the reservoir and first and second pressure control mechanisms for limiting the reservoir underpressure. The first pressure control mechanism limits reservoir underpressure by controllably introducing replacement fluid (i.e. air or ink) thereto. The second pressure control mechanism limits reservoir underpressure by changing the volume thereof. The two pressure control mechanisms cooperate to regulate the underpressure in the reservoir at a desired value over a broad range of environmental excursions and permit use of a volumetrically efficient package.

13 Claims, 5 Drawing Sheets

METHOD AND APPARATUS FOR EXTENDING THE ENVIRONMENTAL OPERATING RANGE OF AN INK JET PRINT CARTRIDGE

FIELD OF THE INVENTION

The present invention relates to ink jet printing systems, and more particularly to a method and apparatus for extending the environmental operating ranges of such systems.

BACKGROUND AND SUMMARY OF THE INVENTION

Ink jet printers have become very popular due to their quiet and fast operation and their high print quality on plain paper. A variety of ink jet printing methods have been developed.

In one ink jet printing method, termed continuous jet printing, ink is delivered under pressure to nozzles in a print head to produce continuous jets of ink. Each jet is separated by vibration into a stream of droplets which are charged and electrostatically deflected, either to a printing medium or to a collection gutter for subsequent recirculation. U.S. Pat. No. 3,596,275 is illustrative of this method.

In another ink jet printing method, termed electrostatic pull printing, the ink in the printing nozzles is under zero pressure or low positive pressure and is electrostatically pulled into a stream of droplets. The droplets fly between two pairs of deflecting electrodes that are arranged to control the droplets' direction of flight and their deposition in desired positions on the printing medium. U.S. Pat. No. 3,060,429 is illustrative of this method.

A third class of methods, more popular than the foregoing, is known as drop-on-demand printing. In this technique, ink is held in the pen at below atmospheric pressure and is ejected by a drop generator, one drop at a time, on demand. Two principal ejection mechanisms are used: thermal bubble and piezoelectric pressure wave. In the thermal bubble systems, a thin film resistor in the drop generator is heated and causes sudden vaporization of a small portion of the ink. The rapidly expanding ink vapor displaces ink from the nozzle causing drop ejection. U.S. Pat. No. 4,490,728 is exemplary of such thermal bubble drop-on-demand systems.

In the piezoelectric pressure wave systems, a piezoelectric element is used to abruptly compress a volume of ink in the drop generator, thereby producing a pressure wave which causes ejection of a drop at the nozzle. U.S. Pat. No. 3,832,579 is exemplary of such piezoelectric pressure wave drop-on-demand systems.

The drop-on-demand techniques require that under quiescent conditions the pressure in the ink reservoir be below ambient so that ink is retained in the pen until it is to be ejected. The amount of this "underpressure" (or "partial vacuum") is critical. If the underpressure is too small, or if the reservoir pressure is positive, ink tends to escape through the drop generators. If the underpressure is too large, air may be sucked in through the drop generators under quiescent conditions. (Air is not normally sucked in through the drop generators because the drop generators comprise capillary tubes which are able to draw ink against the partial vacuum of the reservoir.)

The underpressure required in drop-on-demand systems can be obtained in a variety of ways. In one system, the underpressure is obtained gravitationally by lowering the ink reservoir so that the surface of the ink is slightly below the level of the nozzles. However, such positioning of the ink reservoir is not always easily achieved and places severe constraints on print head design. Exemplary of this gravitational underpressure technique is U.S. Pat. No. 3,452,361.

Alternative techniques for achieving the required underpressure are shown in U.S. Pat. No. 4,509,062 and in application Serial No. 07/115,013 filed Oct. 28, 1987, now 4,791,438, both assigned to the present assignee. In the former patent, the underpressure is achieved by using a bladder type ink reservoir which progressively collapses as ink is drawn therefrom. The restorative force of the flexible bladder keeps the pressure of the ink in the reservoir slightly below ambient. In the system disclosed in the latter patent application, the underpressure is achieved by using a capillary reservoir vent tube that is immersed in ink in the ink reservoir at one end and coupled to an overflow catchbasin open to atmospheric pressure at the other. The capillary attraction of ink away from the reservoir induces a slightly negative pressure in the reservoir. This underpressure increases as ink is ejected from the reservoir. When the underpressure reaches a threshold value, it draws a small volume of air in through the capillary tube and into the reservoir, thereby preventing the underpressure from exceeding the threshold value.

While the foregoing two techniques for maintaining the ink pressure below ambient have proven highly satisfactory and unique in many respects, they nevertheless have certain drawbacks. The bladder system, for example, is not as volumetrically efficient as might be desired. To minimize the variability of underpressure as a function of reservoir volume, the bladder is desirably of rounded shape. Best volumetric efficiency is obtained, however, if the bladder has a rectangular shape. (Even with a rounded shape, the underpressure is still a function of the bladder's state of collapse and eventually increases to the point that no more ink can be drawn therefrom, even though ink in the reservoir is not exhausted.)

The capillary system suffers with environmental excursions. If the ambient temperature increases, or if the ambient pressure decreases, the air trapped inside the ink reservoir expands. This expansion drives ink from the reservoir and out the printhead nozzles where it may contact the user.

Consequently, it is an object of the present invention to provide an ink jet ink reservoir that overcomes these drawbacks of the prior art.

It is a more particular object of the present invention to extend the pressure and temperature range over which a volumetrically efficient ink jet ink reservoir can operate without leaking.

According to one embodiment of the present invention, an ink jet print head is provided with an ink reservoir having two portions: a fixed volume portion and a variable volume portion. The fixed volume portion can be a rigid chamber. The variable volume portion can be a flexible bladder in a wall of the rigid chamber. Due to volumetric efficiency considerations, the fixed volume portion is desirably larger than the variable volume portion.

Beneath the reservoir is a catchbasin operated at ambient pressure into which ink can be pressure driven from the reservoir through a small coupling orifice. The coupling orifice serves both to convey ink from the reservoir into the catchbasin and to convey fluid (ink or air) from the catchbasin back into the reservoir, depending on the pressure differential. (Due to its occasional role of introducing air into the reservoir, the orifice is sometimes termed a "bubble generator.")

In normal operation, the partial vacuum left in the reservoir when ink is ejected out the print nozzles first causes the flexible bladder portion of the reservoir to collapse. After a certain amount of ink is ejected from the reservoir, the partial vacuum reaches a point at which it draws air into the reservoir from the catchbasin through the small bubble generator orifice. The orifice is sized to begin this bubbling action at a desired underpressure—five inches of water in the illustrated embodiment. Thereafter, as printing continues, the additional underpressure caused by the continued ejection of ink is regulated by the introduction of a corresponding volume of air through the bubble generator orifice.

If the ambient temperature rises, causing the air in the reservoir to expand (or if the ambient pressure diminishes, with similar effect), the bladder starts to restore and expand towards its uncollapsed state so as to contain the additional reservoir volume. In so doing, the bladder continues to exert the bladder restorative force on the ink, maintaining the pressure in the reservoir below ambient to keep the ink in the pen.

In the foregoing case of rising temperature (or decreasing ambient pressure), the bladder restorative force continues to keep the reservoir at a pressure slightly below ambient until the reservoir volume has increased to fully inflate the bladder. At this point, the bladder can no longer serve as a volumetric accumulator and ink is forced to flow through the bubble generator orifice into the catchbasin. (Ink is not driven out through the print nozzle orifii because these orifii are substantially smaller than the bubble generator orifice. Consequently, they require a higher reservoir pressure to drive ink therethrough. This higher pressure is generally never reached because the bubble generator orifice acts to relieve the reservoir pressure before the higher pressure can be attained.)

When the ambient temperature thereafter falls, causing the air pressure in the reservoir to diminish (or when the ambient pressure rises, or when ink is ejected from the reservoir by printing, all with similar effect), ink is drawn from the catchbasin by the pressure differential until it is exhausted. Thereafter, the bladder collapses until the partial vacuum in the reservoir is sufficient to draw air through the orifice from the catchbasin, as described above.

While the foregoing description has focused on a very particular embodiment of an ink jet pen according to the present invention, the invention can more generally be described as including:

a) an ink reservoir;

b) a print head for ejecting ink from the reservoir and thereby leaving a negative pressure therein;

c) a first pressure control mechanism for limiting the negative pressure in the ink reservoir by controllably introducing replacement fluid (i.e. air or ink) thereto; and d) a second pressure control mechanism for limiting the negative pressure in the ink reservoir by changing the volume thereof.

The foregoing and additional objects, features and advantages of the present invention will be more readily apparent from the following detailed description, which proceeds with reference to the accompanying drawings.

DETAILED DESCRIPTION

Figure 1:
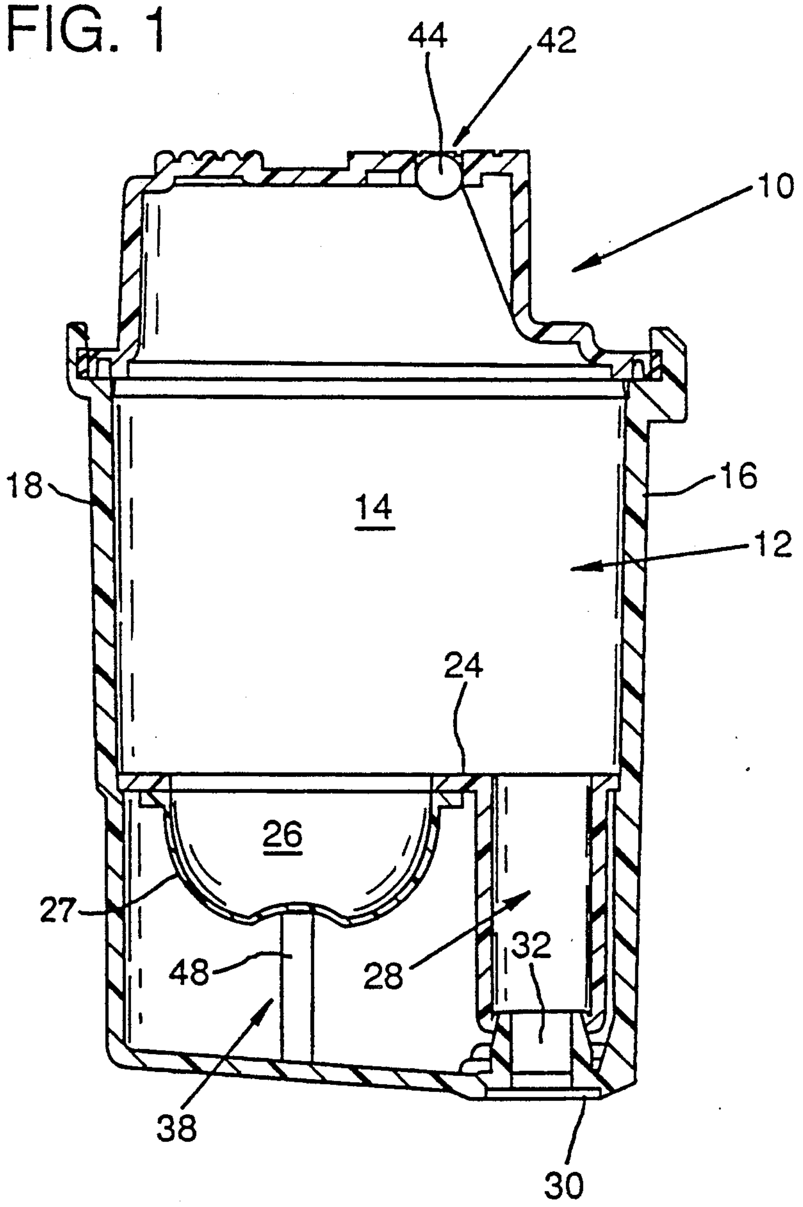
FIG. 1 is a side sectional view of an ink jet print head according to one embodiment of the present invention.
Figure 2:
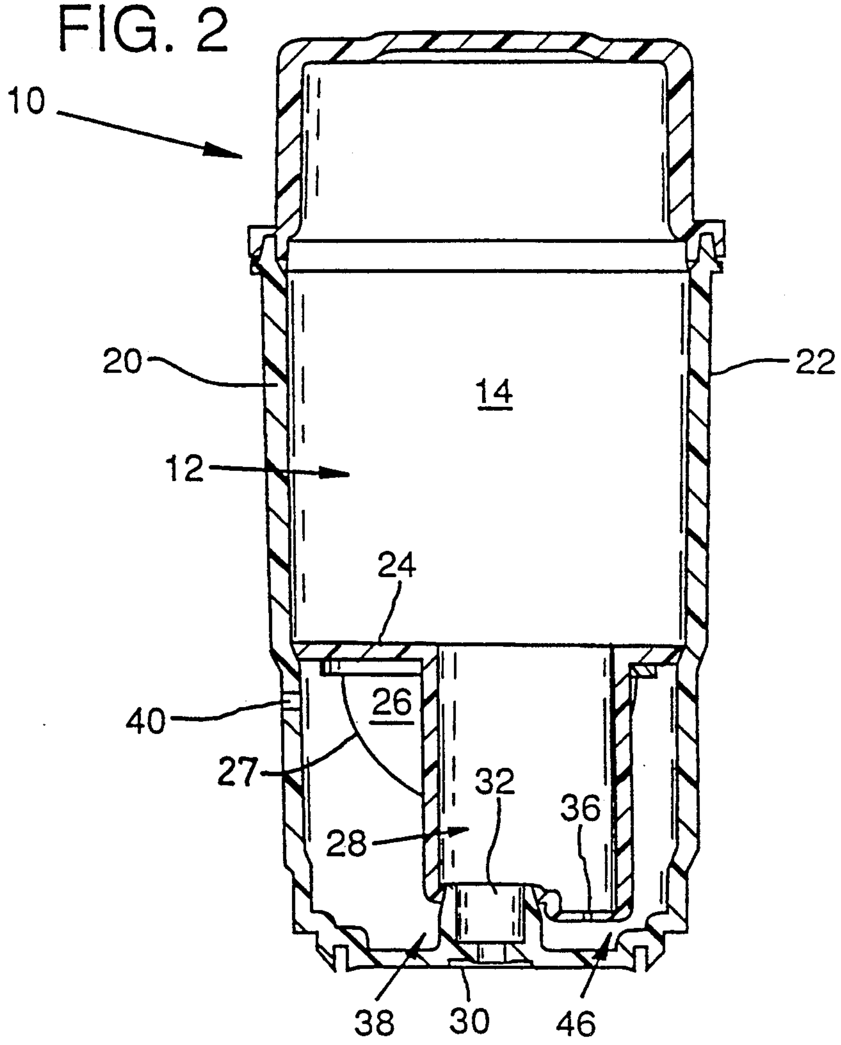
FIG. 2 is a front sectional view of the print head of FIG. 1.
Figure 2A:
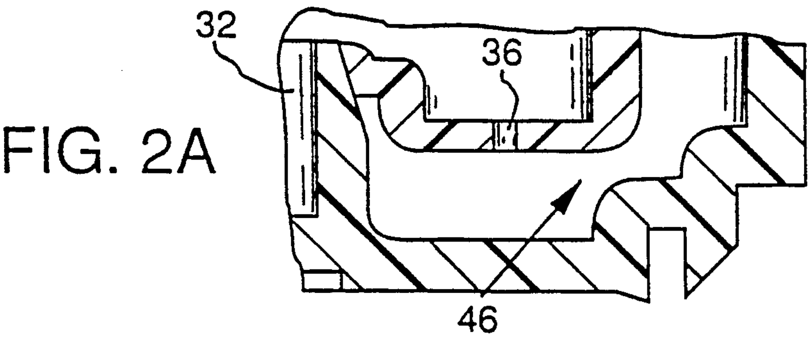
FIG. 2A is an enlarged detail showing a bubble generator orifice in the print head of FIG. 2.

Referring to FIGS. 1 and 2, an ink jet print head 10 according to one embodiment of the present invention includes an ink reservoir 12 having two portions. The first portion 14 is of fixed volume and is formed by rigid walls 16, 18, 20, 22, 24, etc. The second portion 26 is of variable volume and comprises a flexible bladder 27 mounted behind an opening in one of the rigid walls.

Extending downwardly from the fixed volume portion 14 is a well 28 with a print head 30 at the bottom thereof. Ink from the reservoir 12 is drawn through a filter 32 and into the print head 30 from which it is ejected towards the printing medium by thermal or piezoelectric action, as is well known in the art.

Also in the bottom portion of well 28 is a small orifice 36 (FIG. 2) that couples the ink reservoir 12 to a catchbasin 38 positioned at the bottom of the assembly. Orifice 36 serves both to permit ink to pass from the reservoir 12 into the catchbasin 38 and to permit fluid (air or ink) to pass from the catchbasin into the reservoir, depending on the pressure difference between the two regions. (As noted earlier, this orifice 36 is sometimes termed a bubble generator orifice due to its occasional role in introducing air bubbles into the reservoir.) The size of the bubble generator orifice 36 is selected to be larger than the size of the print nozzle orifii so that, in over pressure conditions, ink will preferentially flow out the bubble generator orifice 36 instead of out the print nozzles. However, the bubble generator orifice 36 is small enough that the ink's surface tension prevents it from being gravitationally driven therethrough—there must be a driving pressure differential. In the illustrated embodiment, the bubble generator orifice diameter is 0.0078 inches and the print nozzle diameter is 0.0020 inches. Catchbasin 38, to which the bubble generator orifice 36 leads, is vented to atmospheric pressure by a vent 40 located in the upper sidewall of the catchbasin, beneath the platform 24 in which the bladder 26 is mounted.

In operation, the reservoir 12 is initially filled with ink through an opening 42 which is thereafter sealed with a plug 44. When the pen is first printed, ink ejected from the print head leaves a corresponding partial vacuum or underpressure in the reservoir 12 which causes the flexible bladder 27 to begin collapsing. The collapsing of the bladder reduces the reservoir volume and thus slows the rate at which the partial vacuum builds with continued ejection of ink.

Despite the bladder's moderating action on reservoir pressure, the underpressure nonetheless continues to increase with continued ejection of ink. This increase continues until the pressure differential between the ink reservoir 12 and the vented catchbasin 38 is sufficient to pull a bubble of air through the bubble generator orifice 36 and into the reservoir. This bubble of air replaces a volume of ink that has been ejected from the reservoir and thereby relieves part of the partial vacuum in the reservoir. Thereafter, continued ejection of ink will not further collapse the bladder 27 but will instead draw in additional bubbles of air through the bubble generator 36. The bubble generator thus acts as a pressure regulator that controllably introduces air into the reservoir so as to prevent the reservoir pressure from fully attaining ambient.

Figure 3:
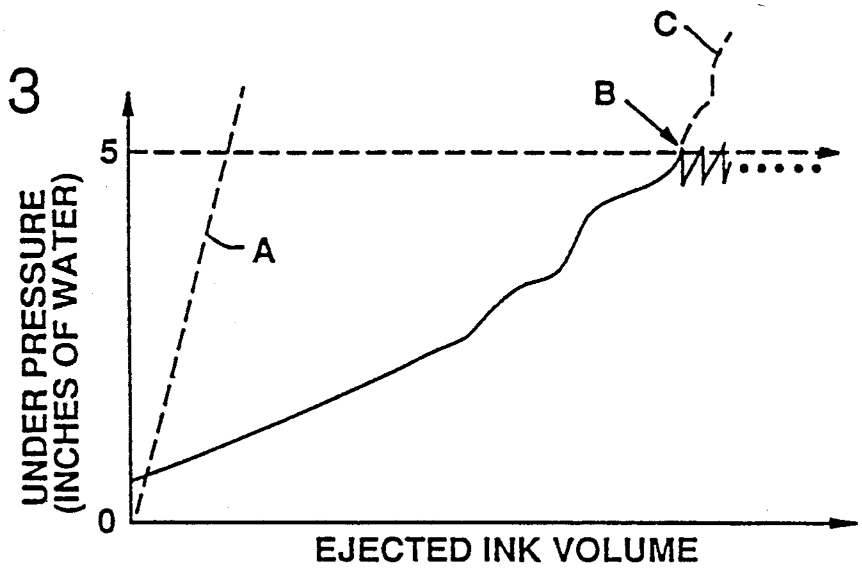
FIG. 3 is a chart illustrating ink reservoir underpressure as a function of ejected ink volume for the print head of FIGS. 1 and 2.

FIG. 3 is a chart illustrating the relationship between the reservoir underpressure and the ejected ink volume. Before any ink is ejected from the reservoir, the reservoir may be at a slight underpressure by reason of the restorative force of the flexible bladder pulling on the ink in the reservoir. As printing begins, the underpressure builds slowly as the bladder collapses, as shown by the solid curve. (If there was no flexible bladder present to moderate the underpressure, it would increase much more rapidly, as shown by the dashed curve labelled "A".)

As the ejected ink volume increases, the curve may become somewhat irregular, due to the non-linear behavior of the bladder as it folds onto itself while collapsing. At the point labelled "B", the underpressure is sufficient to start pulling bubbles through the bubble generator orifice 36 and the underpressure thereafter stabilizes around this "bubble pressure" (five inches of water in the illustrative embodiment). The underpressure drops suddenly each time a bubble is introduced and then increases back up towards the bubble pressure with continued ejection of ink. When the bubble pressure is again reached, another bubble is introduced and the underpressure falls again. The process continues until the reservoir is exhausted of ink. (Line "C" in FIG. 3 represents the underpressure that would occur if the bubble generator was omitted. As can be seen, the underpressure would rise rapidly and would soon prevent the ejection of ink from the pen.)

While ejection of ink is the principle mechanism causing reservoir underpressure to vary, it is not the only one. Environmental factors, such as ambient pressure and temperature, also play a role. For example, if the ambient pressure outside the reservoir increases, the reservoir underpressure (i.e. its partial vacuum relative to ambient) increases as well. Similarly, if the ambient temperature decreases, the air inside the reservoir contracts according to the ideal gas laws, causing a corresponding reduction in net reservoir volume and with it a corresponding increase in the reservoir underpressure. In both cases, the bladder and bubble generator orifice act as described earlier to counteract these changes in reservoir underpressure and regulate the underpressure near the desired value.

Environmental factors can also tend to decrease the reservoir underpressure (i.e bring the ink pressure up towards, or even above ambient pressure). This can occur, for example, if the ambient pressure falls or if the ambient temperature rises. In such cases, the bladder restores and expands towards its non-collapsed state to relieve the increased pressure and counteract this effect. In so doing, it continues to exert the bladder restoring force on the ink to hold it in the reservoir.

If the ambient pressure continues to fall, or if the ambient temperature continues to rise, the bladder will continue to exert its restorative force on the ink and maintain it below atmospheric pressure until the bladder becomes fully inflated. Thereafter, further increases in ink pressure will drive ink through the bubble generator 36 and into the catchbasin 38.

At this point the bladder 27 is fully expanded and the catchbasin 38 contains ink. When conditions thereafter change and the reservoir underpressure increases (i.e. by ejection of ink from the reservoir, by an increase ambient pressure, or by a decrease in ambient temperature), the pen 10 draws ink through the bubble generator 36 into the reservoir 12 from the catchbasin 38. Note that the pen in this circumstance operates differently than when the catchbasin contains only air. When the catchbasin contains only air and the underpressure increases, the underpressure is moderated by a collapse of the bladder. If the catchbasin contains ink, however, the underpressure is moderated by drawing ink into the reservoir from the catchbasin. The difference is attributed to the higher pressure differential required to pull a bubble of air into the ink-filled reservoir than to pull more ink. The air bubble has surface tension that must be overcome before it can bubble into the reservoir. The ink from the catchbasin does not.

Continued ejection of ink from the reservoir (or environmental change that tends to increase underpressure) continues to draw ink from the catchbasin into the reservoir until the ink in the catchbasin is exhausted. Thereafter, the situation is similar to that before the pen has been used—the catchbasin is dry and the bladder is fully expanded. Further ejection of ink from the pen (or corresponding environmental change) causes the bladder to collapse. In its collapsed (or partially collapsed) state, the bladder exerts a restorative force on the ink which maintains the pressure in the reservoir below ambient. The bladder continues to collapse with further ejection of ink until the bladder restorative force (i.e. the reservoir underpressure) reaches the point at which air bubbles are drawn through bubble generator 36. The process thereafter continues substantially as described earlier, with a bubble introduced through the bubble generator orifice 36 each time the reservoir underpressure exceeds the bubble pressure.

From FIG. 2 it can be seen that the bubble generator orifice 36 leading to the catchbasin is not at the lowest point of the catchbasin. However, the catchbasin is desirably formed of plastic that causes the ink thereon to bead in an upright geometry under the force of its own surface tension. This permits the orifice 36 to drain the catchbasin substantially completely despite its elevation above the catchbasin floor. The location of the orifice near the corner 46 of the catchbasin also aids in complete ink withdrawal since the ink tends to collect in this corner into which it was introduced.

From the foregoing discussion, it will be recognized that one important requirement is to design the bladder 27 (i.e. its material and geometry) so that its restorative pressure is between the bubble pressure and the ambient pressure. That is, the bladder should be designed to collapse over a range that includes partial vacuums of between zero and five inches of water. If the bladder does not operate in this range, it will be ineffective in regulating reservoir pressure since the bubble generator would always act to relieve any excessive reservoir underpressure before the bladder was prompted to collapse. In the illustrated embodiment, the bladder 27 is formed of ethylene propylene diene monomer having a thickness of 0.024 inches and a radius of curvature of 0.451 inches.

In the preferred embodiment, the bladder is not permitted to assume its fully hemispherical shape. Such a geometry resists collapsing. Instead, the bladder is dimpled, either during fabrication or by a dimpling finger 48 (FIG. 1). By this arrangement, the bladder can begin collapsing immediately as the underpressure increases, and does not require a high initial underpressure as would a hemispherical bladder before it begins its collapse.

Figure 4:
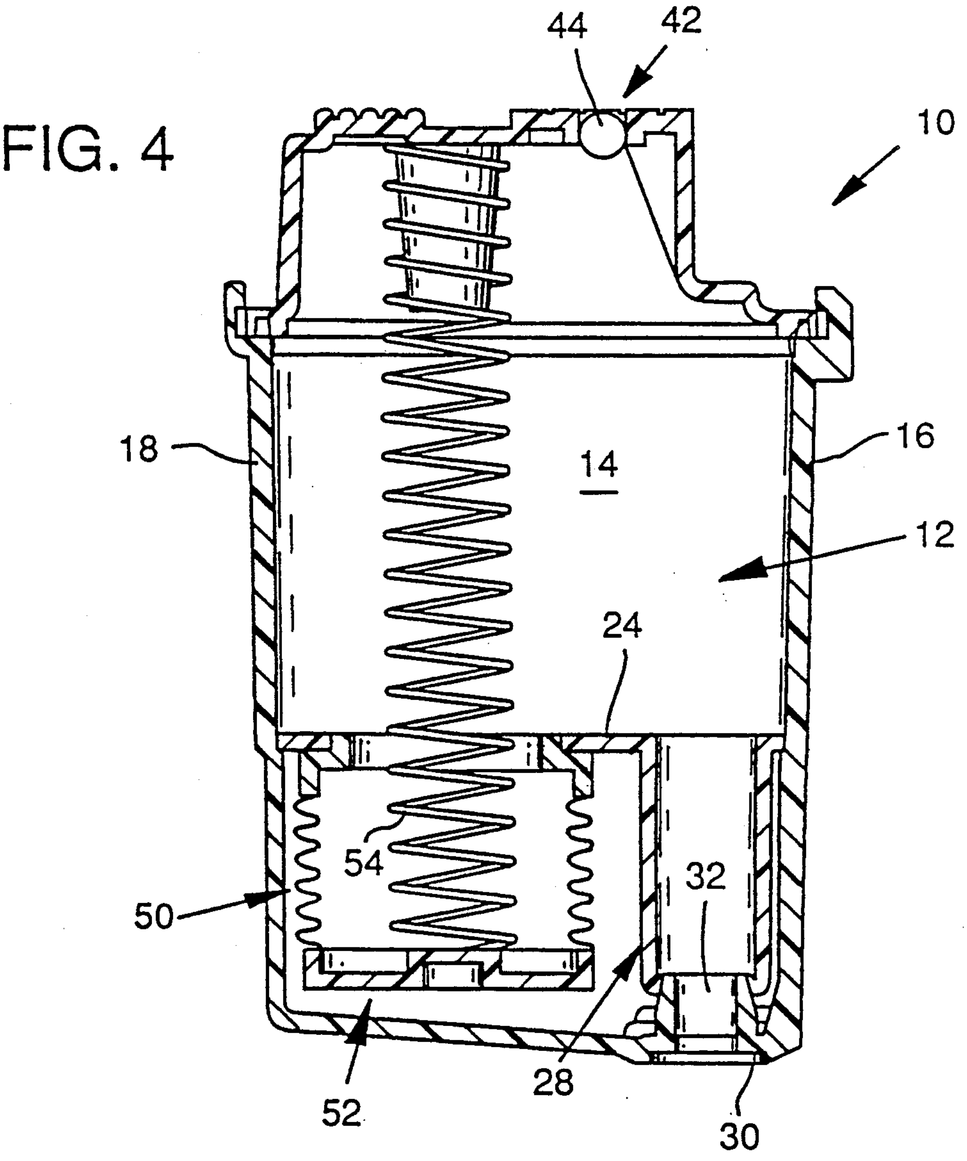
FIG. 4 is a side sectional view of an ink jet print head according to another embodiment of the present invention.
Figure 5:
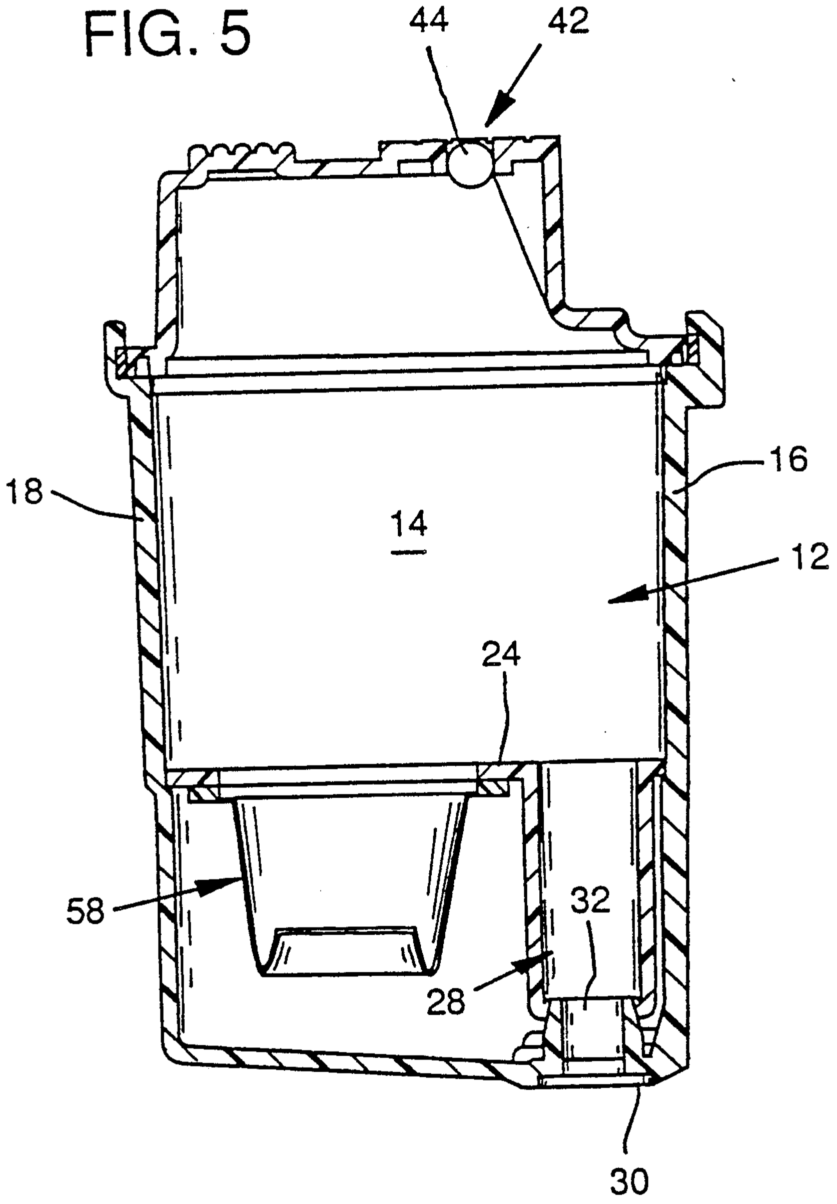
FIG. 5 is a side sectional view of an ink jet print head according to still another embodiment of the present invention.

FIGS. 4 through 5 illustrate alternative embodiments of the present invention. In the FIG. 4 embodiment, the variable volume portion of the reservoir is formed by a bag 50. Bag 50 has an end piece 52 positioned therein and is urged towards a fully open position by a spring 54. The spring 54 is biased between the bag end piece 52 and a spring boss 56 in the top of the reservoir. Operation of the FIG. 4 embodiment is substantially identical to that of the FIGS. 1-2 embodiment except that the reservoir underpressure is a more linear function of ejected ink volume since the irregular collapsing of a hemispherical bladder is avoided.

FIG. 5 shows another embodiment similar to FIGS. 1,2 and 4 but employing a rolling diaphragm 58 as the variable volume portion of the reservoir. The rolling diaphragm again behaves substantially linearly in response to increases in reservoir underpressure.

Figure 6:
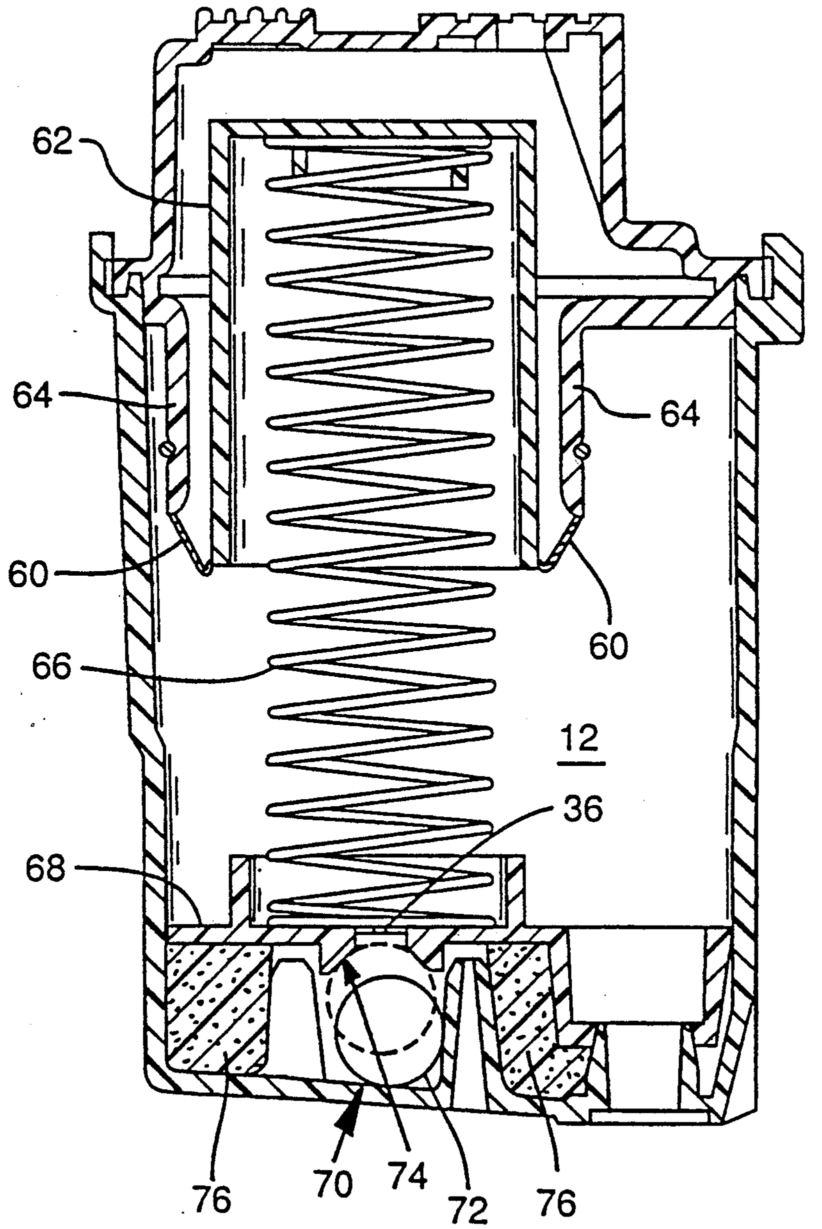
FIG. 6 is a side sectional view of an ink jet print head according to yet another embodiment of the present invention.

FIG. 6 shows yet another embodiment of the present invention. In this embodiment the variable volume portion of the reservoir is positioned above, rather than below, the fixed volume portion. The variable volume portion here includes a rolling diaphragm 60 in combination with a piston 62, a fitment 64 and a spring 66.

In operation, the reservoir 12 is initially filled with ink and the piston 62 is forced to a fully upward position by spring 66, thereby fully stretching diaphragm 60. As ink is ejected from the pen, the reservoir underpressure increases. As the underpressure increases, the piston 62 travels downwardly, with very little friction, until it finally stops in contact with a bottom platform 68. Further ejection of ink from the reservoir causes air to enter the reservoir through the bubble generator 36 to regulate the reservoir underpressure. This air accumulates.

Again, temperature and altitude changes (exogeneous effects) may act on the pen, causing the reservoir underpressure to diminish. When this occurs, the piston 62 moves vertically upward, acted on by the now unbalanced air pressure over piston force and the spring force. This movement causes the pen to reestablish a new underpressure equilibrium, just slightly less than the prior condition. This process can continue until the piston/diaphragm/spring components reach their original uppermost vertical position.

If desired, the pen of FIG. 6 can be equipped with a ball check valve 70 to prevent the inadvertent introduction of air into the reservoir. It will be recognized that if the pen (or the printer in which it is mounted) is inverted, ink will flow away from the bubble generator orifice 36 and may permit air to freely enter the reservoir, reducing underpressure to zero. This, in turn, may cause a small amount of ink to flow out the pen's printing orifii. The unrestricted introduction of air to the reservoir also defeats the pen's temperature and elevation compensation capabilities by permitting the piston/diaphragm assembly to return to the original, extended position, with an air volume in the reservoir.

To prevent these undesirable conditions, a ball check 72 falls to a seat 74 provided near the location of the bubble generator whenever the pen is inverted, thereby effectively sealing the bubble generator and preserving the reservoir underpressure. When the pen is returned to the normal position, the ball falls from the seat and permits normal underpressure regulation to resume. Although shown in just this FIG. 6 embodiment, the ball check valve 70 can be used in any form of the invention.

Finally, the pen of FIG. 6 is shown as including absorbent foam 76 in the catchbasin. This foam captures and retains any ink driven to the catchbasin by exogenous effects and prevents any ink from flowing out the air vent. At the same time, and at all times, the absorbent foam allows air to pass freely between the vent and the bubble generator, thereby ensuring normal underpressure regulation. This foam can be used in any embodiment and is a last resort to keep ink off of the user.

The above-described arrangements provide a variety of advantages over the prior art. Principal among these is the extended pressure and temperature range over which the ink reservoirs can hold ink in the pen. As an added benefit, these arrangements permit the catchbasins to be used to store part of the initial load of ink, thereby increasing volumetric efficiency. Finally, these designs permit essentially all of the ink to be used for printing, since none is caught in a tightly collapsed bladder. (Any ink that remains in the bladder 27 of FIG. 1 can be dislodged by tilting the pen so the ink can flow into the well 28 from which it can be printed.)

Having described and illustrated the principles of our invention with reference to a preferred embodiment and several variations thereof, it should be apparent that the invention can be modified in arrangement and detail without departing from such principles. For example, while the invention has been illustrated with reference to a vent in the upper side of the catchbasin, other vent geometries, such as a chimney extending upwardly from the floor of the catchbasin as shown in FIG. 6, could alternatively be used. Similarly, while the invention has been illustrated with reference to a bubble generator orifice coupling the reservoir to the catchbasin, a variety of other valve mechanisms, such as the check valve disclosed in U.S. Pat. No. 4,677,447, could be substituted therefor.

In view of the wide range of embodiments and uses to which the principles of the present invention can be applied, it should be understood that the apparatuses and methods described and illustrated are to be considered illustrative only and not as limiting the scope of the invention. Instead, our invention is to include all such embodiments as may come within the scope and spirit of the following claims and equivalents thereof.

We claim:

1. An ink jet printing apparatus comprising:

an ink reservoir;

a print head for ejecting ink from the reservoir, the ejection of ink from the reservoir decreasing the pressure in the reservoir;

first pressure control means for limiting the decrease in the pressure in the ink reservoir by controllably introducing replacement fluid into the reservoir; and second pressure control means for limiting the decrease in the pressure in the ink reservoir by changing the volume thereof.

2. The ink jet printing apparatus of claim 1 in which the second pressure control means comprises a member movable in response to the pressure in the reservoir.

3. The ink jet printing apparatus of claim 2 in which, for excursions of negative pressure in the ink reservoir below a threshold value, the first pressure control means is inoperative.

4. The ink jet printing apparatus of claim 2 in which the movable member includes biasing means tending to increase the volume of the reservoir.

5. The ink jet printing apparatus of claim 1 in which the first pressure control means includes means for introducing replacement fluid to the ink reservoir only after the negative pressure therein passes a threshold value.

6. The ink jet printing apparatus of claim 5 in which the first pressure control means comprises:

a catchbasin;

means coupling the catchbasin to ambient pressure;

means defining an orifice establishing a fluid path through which the ink reservoir can draw fluid from the catchbasin in response to pressure differentials therebetween; and pressure regulator means for limiting the flow of fluid from the catchbasin into the ink reservoir so as to prevent the pressure in the ink reservoir from fully attaining ambient pressure.

7. An ink jet printing apparatus comprising;

an ink reservoir for containing ink;

a catchbasin;

means for maintaining the catchbasin at ambient pressure;

orifice means for establishing a fluid path through which ink can be dispelled from the reservoir to the catchbasin when a sufficient pressure differential exists therebetween; and movable means for changing the volume of the ink reservoir, said movable means being operative over a first range of reservoir pressure for relieving pressure in the reservoir to prevent ink from being driven in through the orifice means to the catchbasin by pressures in said range.

8. The ink jet printing apparatus of claim 7 in which the movable means includes means responsive to the pressure in the ink reservoir to change the volume thereof.

9. The ink jet printing apparatus that includes an ink reservoir with a movable member, said movable member permitting the reservoir to contract in volume as ink is ejected therefrom, said contraction in volume limiting the negative pressure in the reservoir until the movable member reaches the limit of its travel, after which point the negative pressure in the reservoir increases until the apparatus is no longer able to eject ink therefrom, an improvement comprising:

vent means responsive to the pressure in the ink reservoir for controllably introducing fluid thereto to permit the apparatus to continue to print after the movable member has reached the limit of its travel.

10. The ink jet printing apparatus of claim 9 in which the vent means includes valve means for preventing the unrestricted introduction of air into the reservoir if the apparatus becomes inverted.

11. An ink jet printing apparatus comprising:

a reservoir, said reservoir having a fixed volume portion and a variable volume portion, the fixed volume portion being larger than the variable volume portion;

a print head for ejecting ink from the reservoir, the ejection of ink from the reservoir decreasing the pressure in the reservoir;

said reservoir including means for varying the volume of the variable volume portion in response to the pressure therein and means for varying the volume of fluid in the reservoir in response to the pressure therein.

12. A method of operation an ink jet pen that includes a reservoir for containing ink, comprising the steps:

regulating the reservoir underpressure by varying the size of the reservoir during a first phase of operation; and regulating the reservoir underpressure by introducing air thereto during a second phase of operation.

13. The method of claim 12 which further comprises the step of limiting reservoir pressure by transferring ink from the reservoir to a catchbasin during a third phase of operation.

* * * * *

US004992802C1

(12) REEXAMINATION CERTIFICATE (4828th)

United States Patent

Dion et al.

(10) Number: US 4,992,802 C1

(45) Certificate Issued: Aug. 12, 2003

(54) METHOD AND APPARATUS FOR EXTENDING THE ENVIRONMENTAL OPERATING RANGE OF AN INK JET PRINT CARTRIDGE

(75) Inventors: John H. Dion, Corvallis, OR (US); Thomas H. Winslow, Corvallis, OR (US)

(73) Assignee: Hewlett-Packard Company, Palo Alto, CA (US)

Reexamination Request:
No. 90/006,031, Jun. 8, 2001

Reexamination Certificate for:

| | |
|---|---|
| Patent No.: | **4,992,802** |
| Issued: | **Feb. 12, 1991** |
| Appl. No.: | **07/289,876** |
| Filed: | **Dec. 22, 1988** |

(51) Int. Cl.[7] .................................................. B41J 2/175

(52) U.S. Cl. ......................................................... 347/87

(58) Field of Search ...................................... 347/85–87

(56) References Cited

U.S. PATENT DOCUMENTS 4,475,116 A 10/1984 Sicking et al.

*Primary Examiner*—Judy Nguyen

(57) ABSTRACT

An ink jet print cartridge includes an ink reservoir, a print head for ejecting ink from the reservoir and first and second pressure control mechanisms for limiting the reservoir underpressure. The first pressure control mechanism limits reservoir underpressure by controllably introducing replacement fluid (i.e. air or ink) thereto. The second pressure control mechanism limits reservoir underpressure by changing the volume thereof. The two pressure control mechanisms cooperate to regulate the underpressure in the reservoir at a desired value over a broad range of environmental excursions and permit use of a volumetrically efficient package.

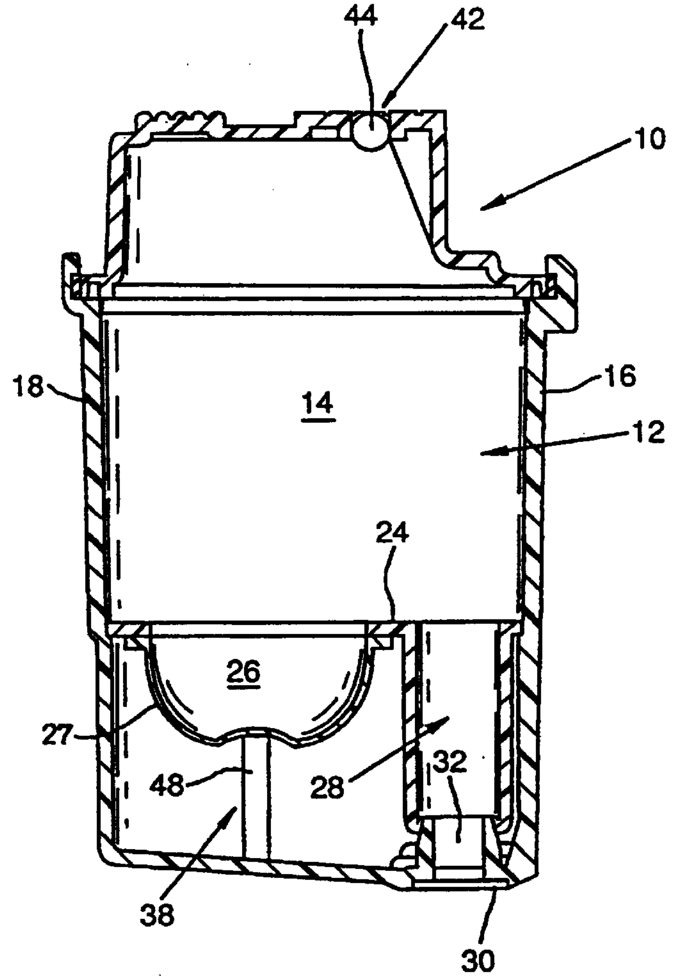

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 7–11 is confirmed.

Claims 1 and 12 are determined to be patentable as amended.

Claims 2, 3, 4, 5, 6 and 13, dependent on an amended claim, are determined to be patentable.

New claims 14–17 are added and determined to be patentable.

1. An ink jet printing apparatus comprising:

an ink reservoir;

a print head for ejecting ink from the reservoir, the *reservoir being sealed so that* ejection of ink from the reservoir [decreasing] *decreases* the pressure in the reservoir;

first pressure control means for limiting the decrease in the pressure in the ink reservoir by controllably introducing replacement fluid into the reservoir; and second pressure control means for limiting the decrease in the pressure in the ink reservoir by changing the volume thereof.

12. A method of [operation] *operating* an ink jet pen that includes a reservoir for containing ink, comprising the steps:

regulating the reservoir underpressure by varying the size of the reservoir during a first phase of operation; and regulating the reservoir underpressure by introducing air thereto during a second phase of operation.

*14. The method of claim 12 wherein regulating the underpressure by introducing air includes pulling air bubbles into the reservoir.*

*15. The method of claim 14 wherein pulling air bubbles into the reservoir includes providing an orifice between ambient air and ink in the reservoir and sizing the orifice so that air bubbles are pulled through the orifice and into the ink of the reservoir upon establishment of a differential between the pressure in the reservoir and atmospheric pressure outside the reservoir.*

*16. The method of claim 15 including using surface tension of the ink in the reservoir to seal the orifice when bubbles are not being pulled therethrough.*

*17. An inkjet printing apparatus comprising:*

*an ink reservoir having a negative pressure established therein;*

*a print head for ejecting ink from the reservoir, the ejection of ink from the reservoir decreasing the pressure in the reservoir;*

*first pressure control means for limiting the decrease in the pressure in the ink reservoir by controllably introducing replacement fluid into the reservoir in which, for excursions of negative pressure in the ink reservoir below a threshold value, the first pressure control means is inoperative; and*

*second pressure control means for limiting the decrease in the pressure in the ink reservoir by changing the volume thereof and comprising a member that is movable in response to the pressure in the reservoir.*

* * * * *